(12) United States Patent
Childers

(10) Patent No.: US 6,956,490 B2
(45) Date of Patent: Oct. 18, 2005

(54) PROJECTOR WITH CONSUMABLE COMPONENT HAVING MEMORY DEVICE

(75) Inventor: Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 32 days.

(21) Appl. No.: 10/628,901

(22) Filed: Jul. 28, 2003

(65) Prior Publication Data

US 2005/0024219 A1    Feb. 3, 2005

(51) Int. Cl.[7] ............................................. G08B 21/00
(52) U.S. Cl. ........................ 340/641; 340/638; 340/643
(58) Field of Search ................................ 340/638, 641, 340/643; 353/87, 122; 315/117, 155, 291, 315/292; 347/7, 9, 32; 356/141.4, 141.5

(56) References Cited

U.S. PATENT DOCUMENTS

| 6,039,430 A | 3/2000 | Helterline et al. ............. 347/19 |
| 6,113,208 A | 9/2000 | Benjamin et al. ............... 347/7 |
| 6,268,799 B1 | 7/2001 | Miyashita et al. .......... 340/641 |
| 6,362,573 B1 | 3/2002 | Helbing et al. ............. 315/155 |
| 6,373,201 B2 | 4/2002 | Morgan et al. ............. 315/291 |
| 6,467,911 B1 * | 10/2002 | Ueyama et al. ............... 353/87 |
| 6,483,247 B2 * | 11/2002 | Edwards et al. ............ 315/117 |
| 6,494,562 B1 | 12/2002 | Walker et al. ................ 347/32 |
| 2002/0005697 A1 | 1/2002 | Morgan et al. |
| 2003/0060682 A1 | 3/2003 | Handa et al. |

FOREIGN PATENT DOCUMENTS

| EP | 1 006 734 A3 | 5/2004 |
| JP | 2000-112024 | 4/2000 |
| JP | 2000-112028 | 4/2000 |
| JP | 2000-267061 | 9/2000 |
| JP | 2000-112940 | 4/2002 |
| JP | 2000-341442 | 11/2002 |

* cited by examiner

Primary Examiner—Van T. Trieu

(57) ABSTRACT

A system includes a projector having a consumable component such, as a lamp. The consumable component includes a memory device. An application on the projector has access to the memory device. Additionally, a user interface, updated by the application, is configured to display information from the memory device within the consumable component.

44 Claims, 7 Drawing Sheets

PROJECTOR WITH CONSUMABLE COMPONENT HAVING MEMORY DEVICE

BACKGROUND

The lamps or light bulbs included within many higher-end projectors are quite expensive. As a result, the operators of many such projectors may not have a spare lamp in current inventory. Accordingly, in the event of a lamp failure, some disruption of service typically results.

Because of the costs of service disruption due to a failed projector lamp, customers may attempt to guess when the lamp will fail, and then use that guess to time the purchase of a spare lamp. However, such guesses are typically in error. Additionally, due to model changes and lack of information, customers will frequently purchase the wrong lamp for their projector. The result is increased costs for all parties involved.

Additionally, as time passes prior to a lamp failure, it is frequently the case that the communication link between the owner and/or operator of the projector and the vendor (retailer, manufacturer, etc.) of the projector may become broken. For example, the projector owner may lose the documentation that came with the original purchase and be unable to conveniently contact the vendor. Similarly, the projector owner may change address or telephone number and the vendor may be unable to make contact. Where the communication link between the parties is broken, an opportunity arises for a third party to establish a commercial relationship, thereby costing the original vendor additional sales.

The communication link between the equipment buyer and vendor is also important to enable the manufacturer to be able to supply the buyer with software updates, notice of product recalls, notice of new products and other information. Where the communication link between vendor and customer is broken, the customer fails to receive valuable information, and may establish a commercial relationship with an alternate vendor.

SUMMARY

A system includes a projector having a consumable component, such as a lamp. The consumable component includes a memory device. An application on the projector has access to the memory device. Additionally, a user interface, updated by the application, is configured to display information from the memory device within the consumable component.

BRIEF DESCRIPTION OF THE DRAWINGS

The following detailed description refers to the accompanying figures. In the figures, the left-most digit(s) of a reference number identifies the figure (Fig.) in which the reference number first appears. Moreover, the same reference numbers are used throughout the drawings to reference like features and components.

DETAILED DESCRIPTION

Figure 1:
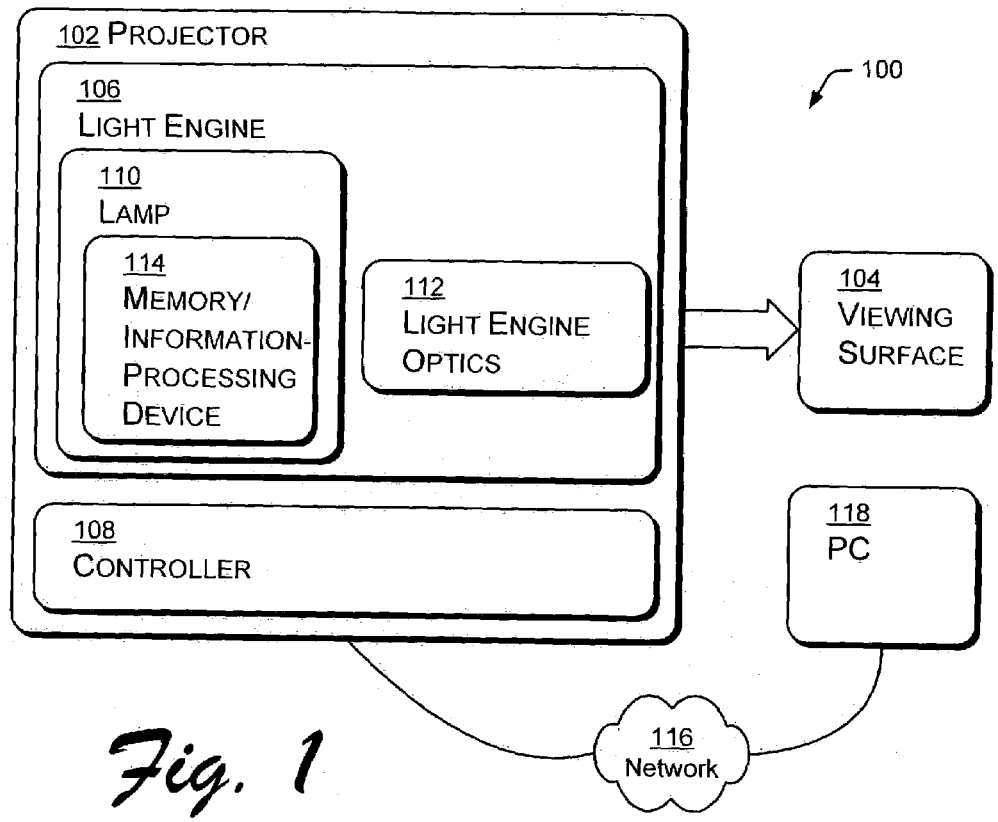
FIG. 1 is a block diagram illustrating an exemplary projector and consumable component having a memory device.

FIG. 1 is a block diagram illustrating a system 100, including; an exemplary projector 102 and viewing screen 104. The projector 102 may include a light engine 106 and controller 108. The light engine 106 typically includes a lamp 110 or similar consumable and/or replaceable component, and light engine optics 112 suitable for projecting an image onto the screen 104. The lamp 110 includes a memory and/or information-processing device 114, smart card or similar information-containing and/or information-processing device. The projector 102 may be connected by a network 116 to a personal computer 118 or other information appliance.

Figure 2:
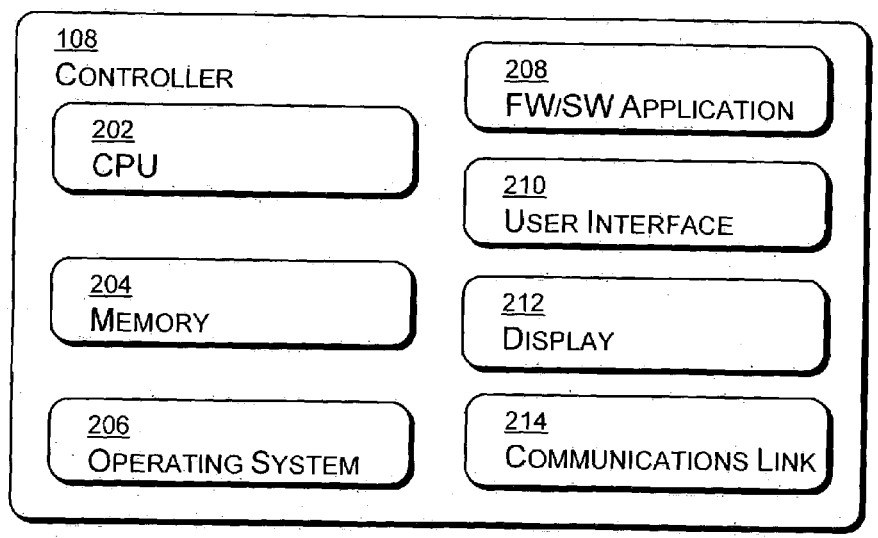
FIG. 2 is a block diagram illustrating exemplary detail of the controller portion of the projector of FIG. 1.

FIG. 2 is a block diagram illustrating exemplary detail of the controller 108 contained within the projector 102 of FIG. 1. The controller regulates the functionality of the projector 102, in a manner that allows images to be displayed on the screen 104. An exemplary controller 108 includes a CPU 202 and memory device 204. An operating system 206 may be used to support operation of one or more software or firmware applications 208. A user interface 210 may be configured for operation on a display 212, such as a LCD display located on an enclosure of the projector 102. Communication between the controller 108 and lamp 110 or information storage device 114 or other replaceable component on the projector 102 is enabled by a communication link or interface 214. The communications link 214 may be wired, RF, IR or similar communications technology allowing the transfer of information.

Figure 3:
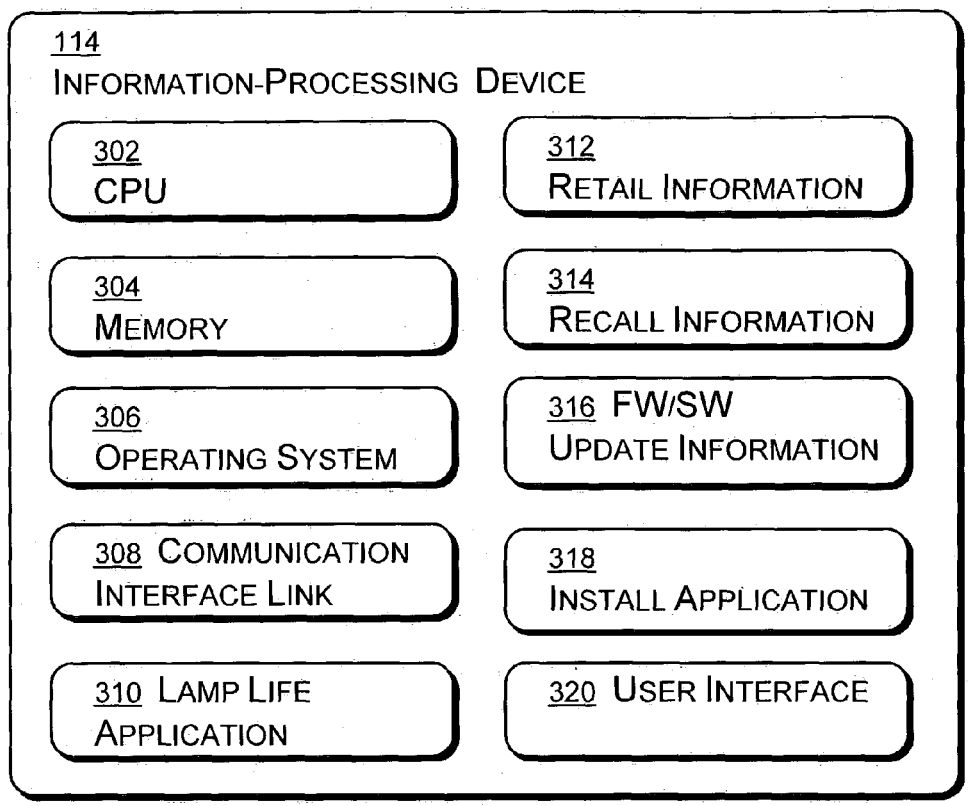
FIG. 3 is a block diagram illustrating exemplary detail of the memory device of FIG. 1.

FIG. 3 is a block diagram illustrating exemplary detail of the information storage or information-processing device 114 of FIG. 1. In lower-cost applications, a memory device 114 may include a smaller integrated circuit capable of storing smaller amounts of information. In higher-cost applications, the information-processing device 114 may utilize smart card or similar technology. For example, a CPU 302 accessing memory 304 may run an operating system 306. Communication between the device 114 and controller 108 of projector 102 is enabled by a communication link or interface 308. The communications link 308 may be wired, RF, IR or similar technology allowing the transfer of information to the communications link 214 on the controller 108 of the projector 102, or similar communications node.

A number of software- and/or firmware-based applications 310–318 may be available for execution on the memory or information-processing device 114. In some cases, these applications may be alternatively be located on the controller 108. For example, a lamp life application 310 is configured to record elapsed time of lamp operation and to estimate remaining lamp life. The estimate may be based on predicted lamp life based on a history of similar lamps. The lamp life application 310 may utilize a threshold value, so that when the measured time of lamp use is within the threshold value of the estimated lamp life, the operator of the projector or other party is notified of the increased likelihood of lamp failure.

A retail information application 312 is configured to provide lamp retail information to the operator of the projector or other party. In a preferred application, the delivery of the retail information is triggered when measured lamp use is within a threshold value of estimated total lamp life. Thus, as the lamp nears the end of its expected useful life, the retail information application 312 delivers to the projector operator lamp retail information. Exemplary lamp retail information may include contact information of a lamp vendor, lamp part numbers and other information. The information may be sent to the projector operator over one or more user interfaces and/or displays, such as the display 212 (FIG. 2) of the controller 108 or the screen 104 (FIG. 1) of the projector 102.

A recall information application 314 is configured to provide information on a product recall that is outstanding on the projector 102 or on any part within the projector. The recall information application 314 is configured to check the model ID of the projector within which the lamp 110 is installed. This model ID is then compared by the recall information application 314 to the model IDs of projectors known to be recalled. Where warranted, the recall information application 314 is configured to notify the operator, so that steps may be taken to process the projector 102 with respect to the recall. Thus, in the course of performing a product recall, a projector manufacturer may configure the recall information application 314 to determine if the lamp 110 (within which resides the media upon which the recall information application 314 may be defined) is installed on such a recalled projector, and, if so, to report notice of the recall to the projector operator.

A firmware and/or software update application 316 is configured to provide firmware and/or software update information to the operator of the projector or other party. For example, the operating system 206 (FIG. 2) or other firmware and/or software applications 208 of the projector 102 may become outdated. The update application 316 is configured to check the revision level of any potentially outdated software, and to compare that level to revision levels known to be available. The revision levels known to be available may be contained within the update application 316 or in memory 304. Where firmware or software having a newer revision level is available to replace firmware or software on the projector 102, the operator of the projector 102 is notified.

An install application 318 is configured to determine if the lamp 110 (FIG. 1) is compatible for installation within the projector 102. Where the information device 114 is a smart card, it may communicate wirelessly with the controller 108 of the projector 102, even while the lamp 110 is still within retail packaging. Thus, the install application 318 may utilize the communications interface link 308 of the information device 114 to make contact with the communications link 214 of the controller 108. The install application 318 may be configured to query the controller 108 to determine the model ID and information associated with the projector 102. The install application 318 is similarly configured with the model ID of the lamp 102, and is also configured with a compatibility table or data from which it may be readily determined if the lamp 110 is compatible for installation on the projector 102. The result of the compatibility check may be communicated to the operator of the projector 102, such as by operation of the user interface 210 operating on the display 212. In some applications, the install application 318 may be operated prior to removal of the lamp 110 from retail packaging. Thus, the lamp 110 may be more easily returned to the manufacturer—still in its original packaging—if it is found to be incompatible with the projector 102.

A user interface 320 on the information device 114 may be graphical and/or text based. It may be projected onto one or more displays. For example, the user interface may be displayed by the projector 102 on an LCD or similar display 212 or on the viewing screen 104. Alternatively, the user interface may be sent over the network 116 a personal computer 118, where it may be displayed. In many applications, such a PC may be available, since it may be required to provide content for display on the screen 104.

Figure 4:
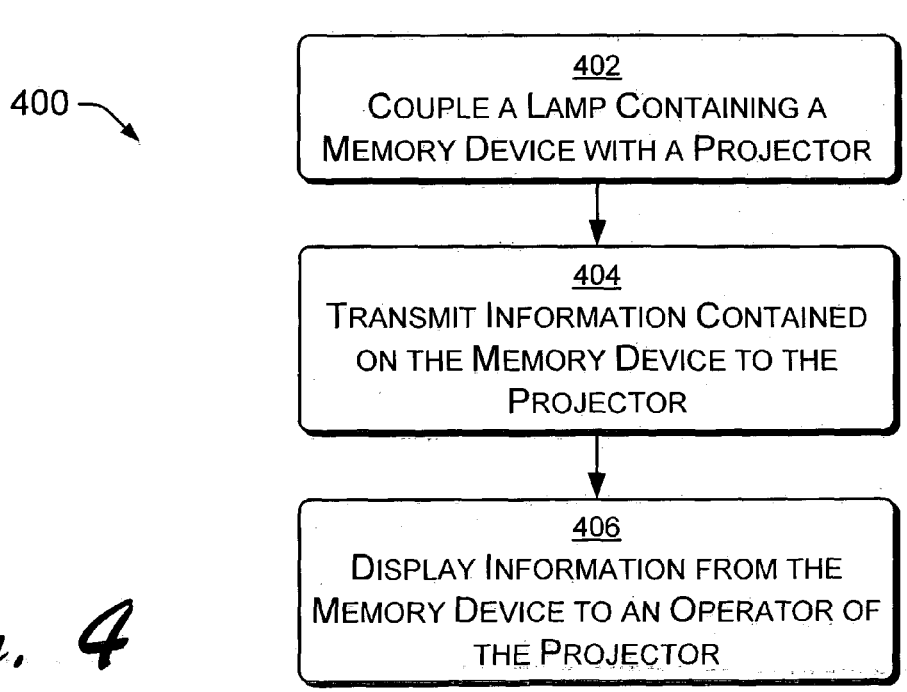
FIG. 4 is a flow diagram illustrating an exemplary method of operation of the projector and replaceable component having a memory device.

FIG. 4 is a flow diagram illustrating an exemplary method 400 of operation of the projector 102 and replaceable component such as a lamp 110 having a memory or information-processing device 114. For example, the method 400 may be implemented by interaction between the information device 114 and the controller 108 of the projector 102. At block 402, a lamp 110, or other consumable and/or replaceable component having a memory or information-processing device 114, is coupled with a projector 102. The coupling may involve moving the lamp 110 or other component into close physical proximity with the projector, wherein communication between the lamp and projector may be initiated. Alternatively, coupling may involve installation of the lamp 110 or other device into the projector. At block 404, information from the device 114 is transmitted to the projector. The transmission may be made by a radio signal (RF) or by direct contact or other means, depending on particular design requirements. At block 406, information from the memory or information-processing device 114 is displayed to the operator of the projector 102. The information may be related to retail information indicating how to buy a new lamp, recall information indicating a product recall of the projector 102, software and/or firmware update information indicating the availability of newer software for operation of the projector 102, or other information.

Figure 5:
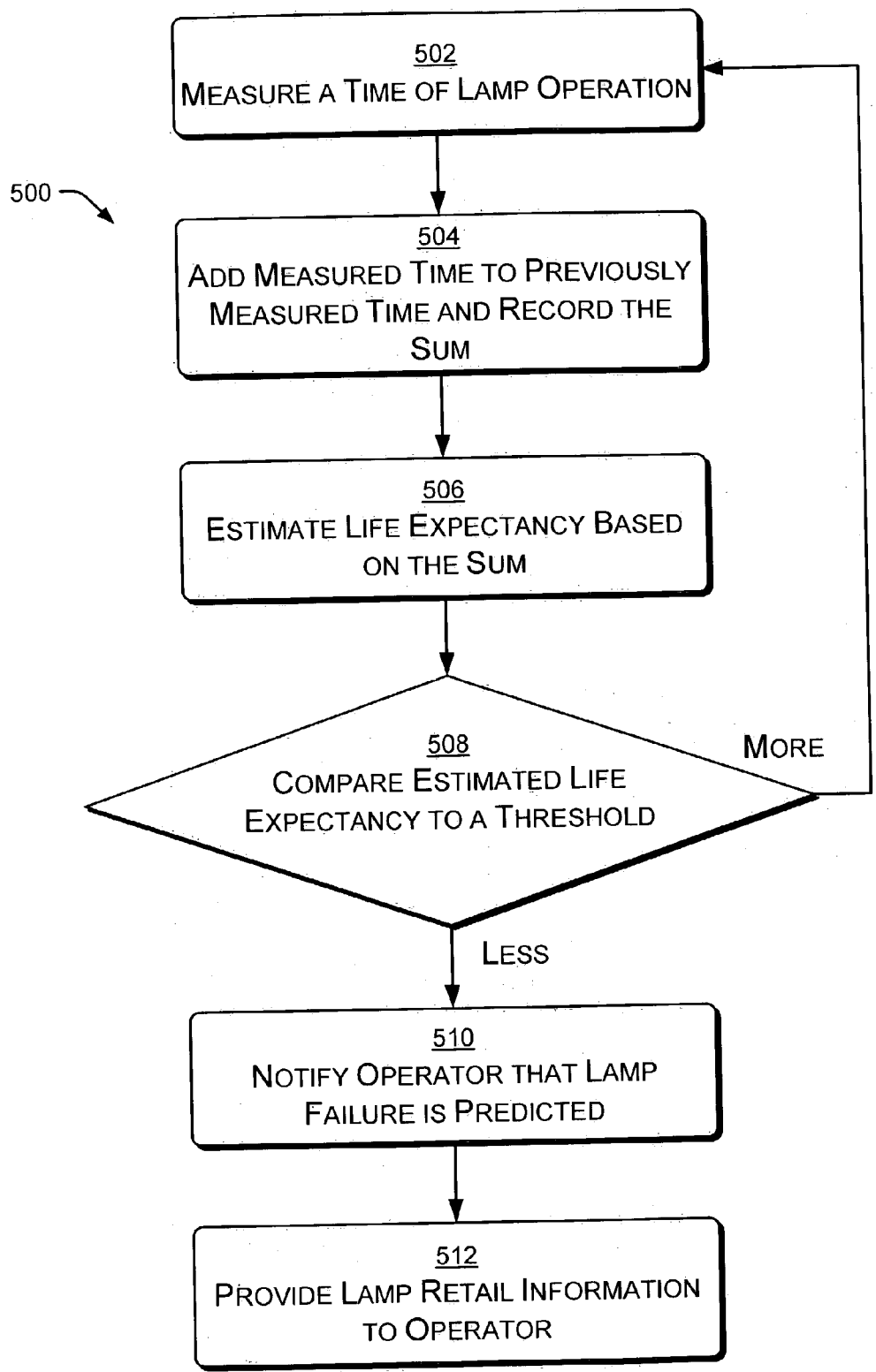
FIG. 5 is a flow diagram illustrating an exemplary method by which retail information may be provided from the memory device of the consumable component in response to impending failure of the lamp of the projector.

FIG. 5 is a flow diagram illustrating an exemplary method 500 by which retail information may be provided from the memory device 114 of the lamp 110 in response to impending failure of the lamp 110 of the projector 102. The method 500 may be implemented by a retail information providing application 312 (FIG. 3) or similar software, firmware or hardware implementation. At block 502, the time of lamp operation is measured. At block 504, the measured time is added to the sum of previously measured time. At block 506, the life expectancy of the lamp is estimated based on a comparison of the sum of the time of lamp operation and an estimated life based on experience with similar lamps. Note that this life expectancy estimate can also take into account information generated as a result of sensors, i.e. temperature, pressure, etc., within the projector system 100. At block 508, a comparison is made between the estimated life and a threshold value. Where the estimated life is more than a threshold value the time-measuring cycle of blocks 502–506 are repeated. At block 510, where the estimated life of the lamp is less than the threshold, the user is notified that lamp failure is predicted. At block 512, in response to the prediction that lamp failure is within a threshold period of time, the operator of the projector 102 is provided with retail information regarding the purchase of a replacement lamp 110. The retail information may include contact information, such as the telephone number, website or address of a vendor of suitable amps.

Figure 6:
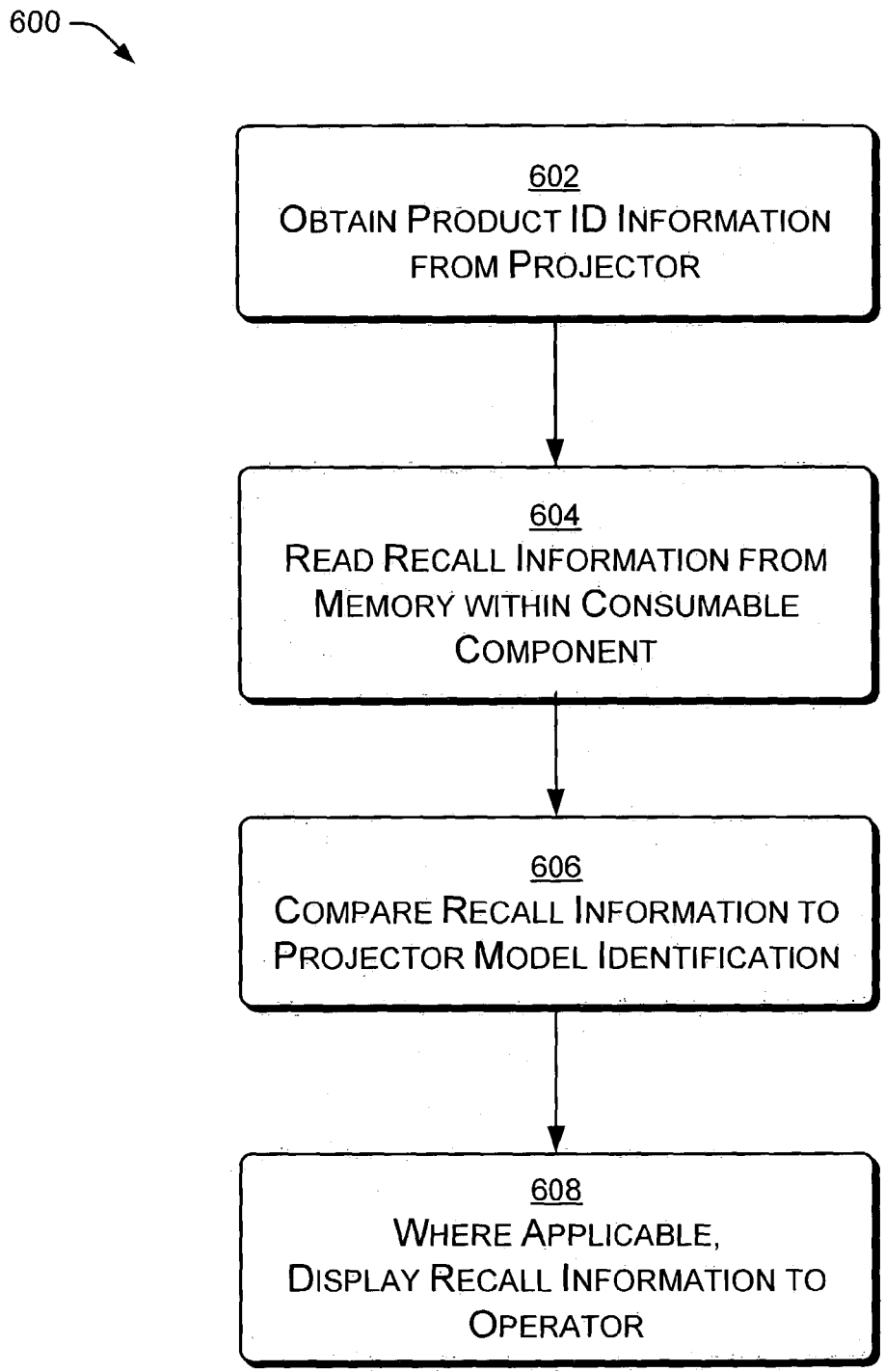
FIG. 6 is a flow diagram illustrating an exemplary method of managing product recall information contained in the memory device of the lamp or other consumable device installed on the projector.

FIG. 6 is a flow diagram illustrating an exemplary method 600 of managing product recall information contained in the memory device 114 of the lamp 110 or other consumable device installed on the projector 102. The method 600 may be implemented by the recall management application 314 or similar software, firmware or hardware implementation. At block 602, model number or ID information is obtained from the projector 102. The product ID information may be contained within the controller 108 of the projector 102. It may be obtained by a recall information application 314, which may be contained within the information device 114 of the lamp 110. In some instances, the recall information application 314 may be located and/or executed on the controller 108.

At block 604, recall information is read, typically from memory 304 within the lamp 110 or other consumable component. Obtaining the recall information from the memory within the lamp 110 allows the recall information application 314 to obtain recall information that is as up-to-date as the manufacture date of the lamp 110.

At block 606, the recall information is compared to the projector model number or ID, thereby determining if the projector is subject to product recall. At block 608, where applicable, the recall information is displayed to the operator of the projector. In many applications, recall information is displayed only in the event that a recall is applicable. In that event, the operator of the projector is typically informed of a procedure by which the projector 102 may be processed by the recall. The recall information displayed to the operator may be conveyed by the user interface 320, which may be projected onto any desired or available display, such as an LCD display 212 on the projector, the projector screen 104 or a PC 118 attached to the projector 102.

Figure 7:
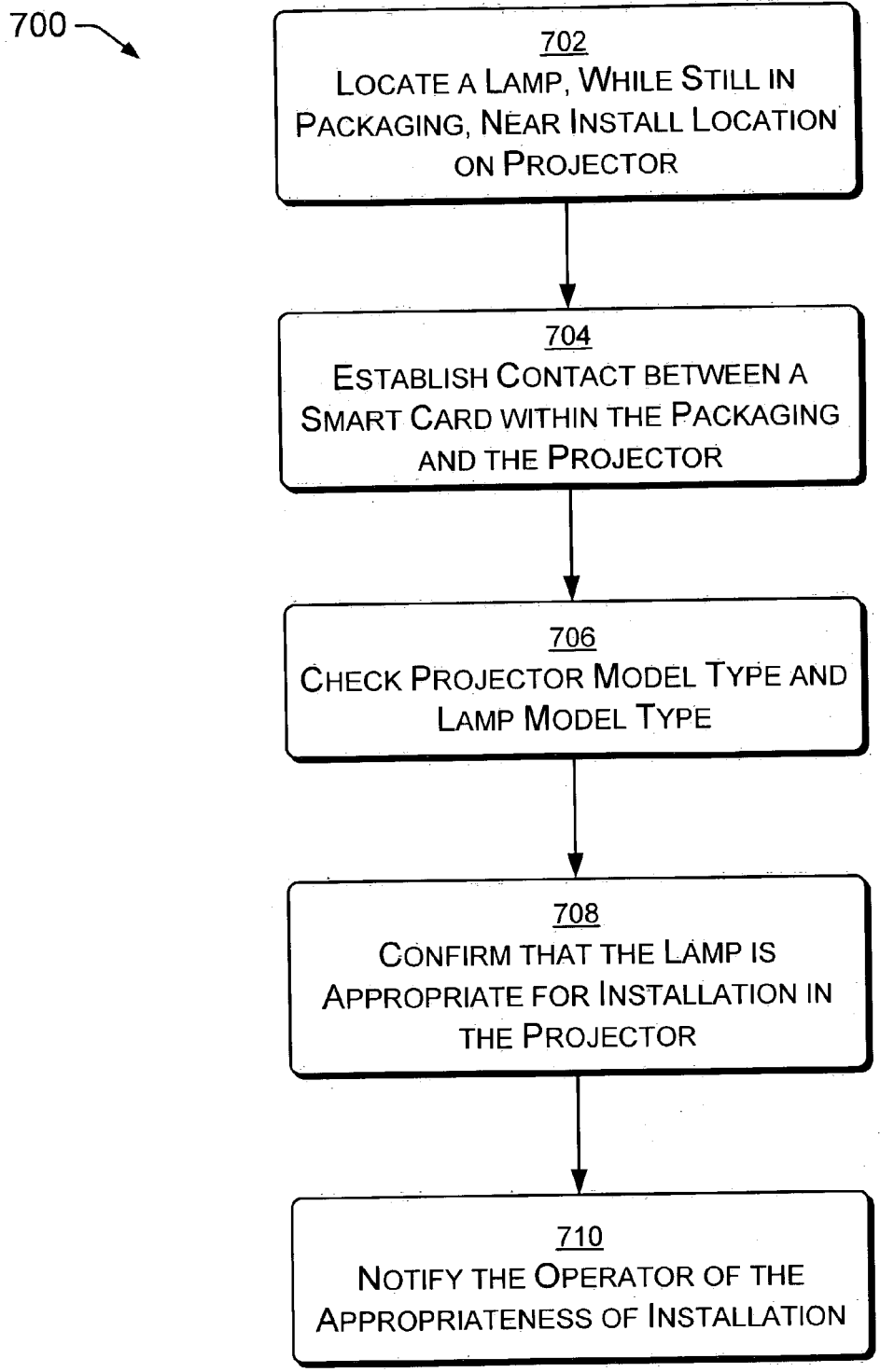
FIG. 7 is a flow diagram illustrating an exemplary method of managing the installation of the lamp on the projector.

FIG. 7 is a flow diagram illustrating an exemplary method 700 of managing the installation of the lamp 110 on the projector 102. Portions of the method 700 may be implemented by an install application 318 or similar software, firmware or hardware implementation. At block 702, the lamp—typically still within packaging—may be manually located near the installation location on the projector 102. For example, the projector operator can hold the lamp near the projector 102. At block 704, where the information-processing device 114 contained within the lamp 110 is a smart card or similar device, contact between the smart card and projector can be made, even without removing the lamp from retail packaging. At block 706, the projector model type and the lamp model type are obtained. The projector model type may be obtained from the controller 108, through a communications link between communications interfaces or links 214 and 308. The lamp model type may be coded into the install application 318, or located in memory 304. At block 708, the install application 318 confirms that the lamp 110 is an appropriate model for installation into the projector 102. At block 710, where the model types of the lamp and projector are not compatible, the operator of the projector may be notified, even before removing the lamp from retail packaging for an attempted installation. The notification to the user may be made by the install application 318 using the user interface 320, wherein the interface 320 is displayed on the viewing screen 104, display 212, PC 118 or other location.

Figure 8:
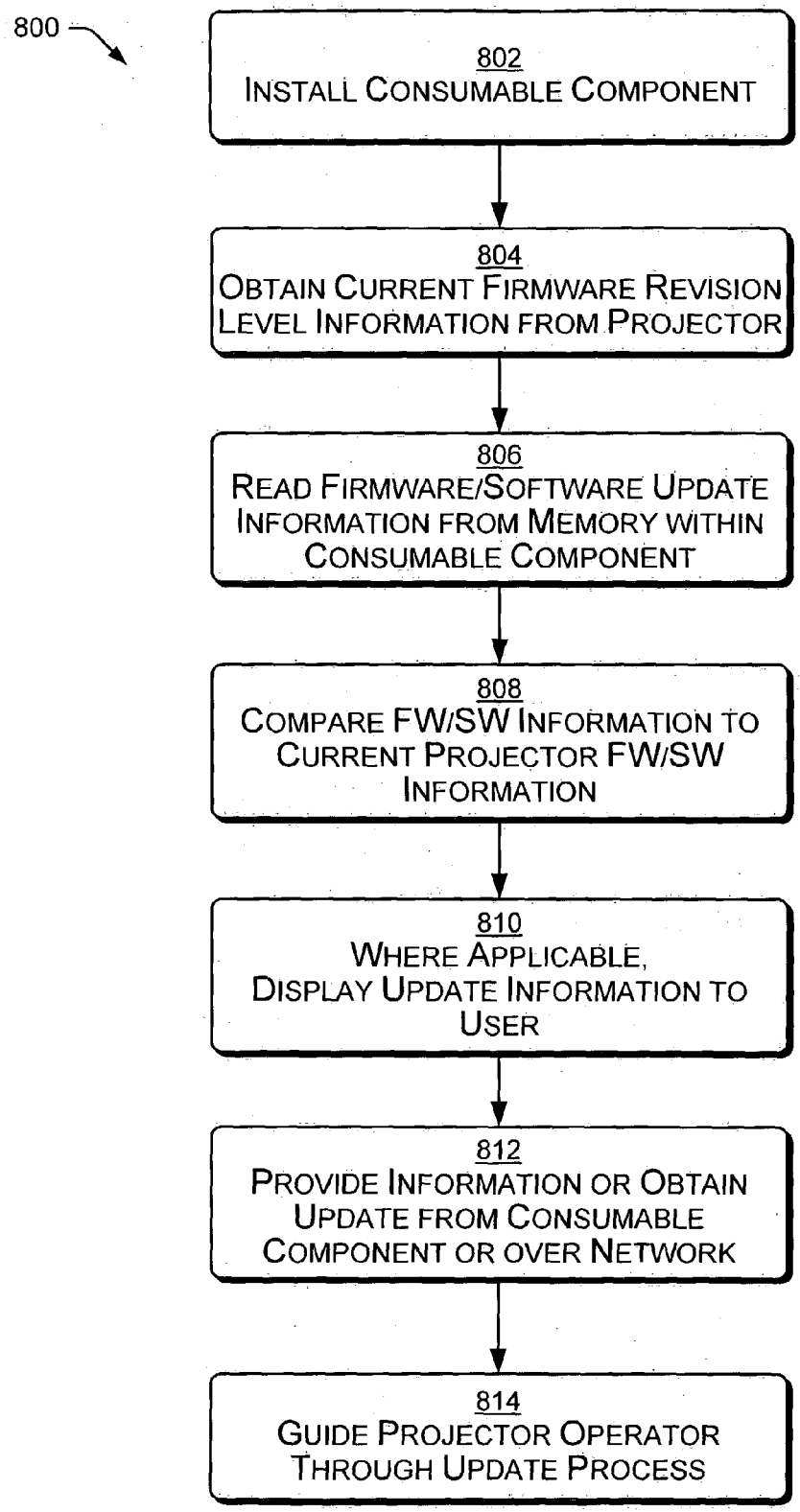
FIG. 8 is a flow diagram illustrating an exemplary method of managing firmware and/or software updates on the projector.

FIG. 8 is a flow diagram illustrating an exemplary method 800 of managing firmware and/or software updates on the projector 102. The method 800 may be implemented by an update information application 316 or similar software, firmware or hardware implementation. At block 802, a consumable component, such as a projector lamp 110, is installed on a projector 102. At block 804, revision level information of currently used firmware and/or software is obtained from the projector 102. For example, the update information application 316 may query the controller 108 for the revision level information of the firmware and/or software 208. These files may or may not be the latest available. At block 806, the revision level of the latest available firmware and/or software is obtained. For example, the information on the latest updates may be obtained from memory 304 or the application 316 or other location within the information device 114. At block 808, the revision level of the software 208 currently used by the projector 102 is compared to the revision level of the latest available software to determine if the currently used software 208 should be updated. At block 810, if the currently used software should be updated, then the operator of the projector is notified. At block 812, the update may be provided over the network 116 of from memory 304 of the information device 114. Typically, the information device provides a link to a website where the latest software is located, and software 208 is updated. At block 814, the operator of the projector may be guided through the application process, thereby replacing outdated software and/or firmware 208 with a later revision of the software.

Figure 9:
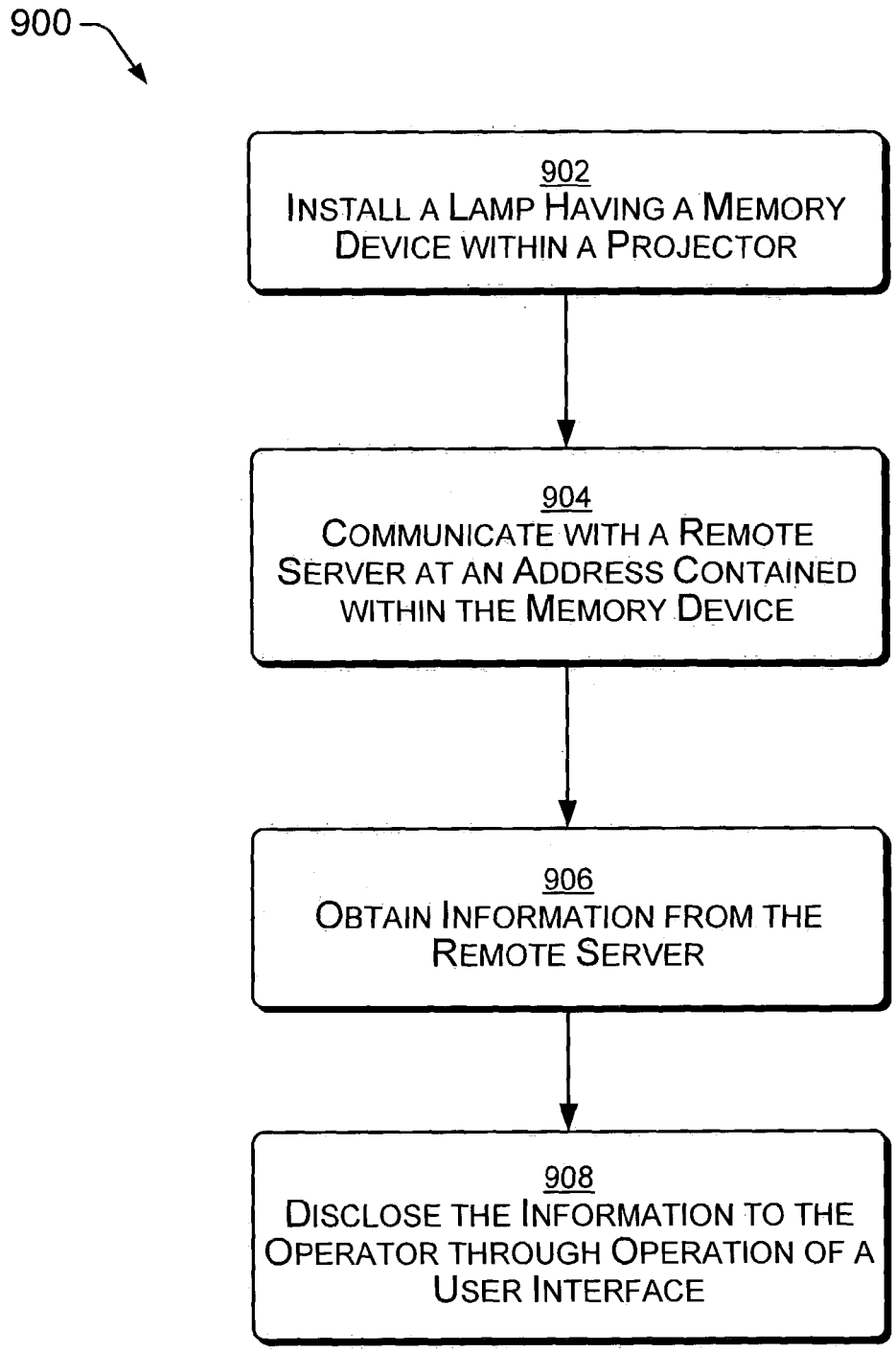
FIG. 9 is a flow diagram illustrating an exemplary method of managing obtaining information from a remote source such as a server for disclosure to an operator of the projector.

FIG. 9 is a flow diagram illustrating an exemplary method 900 of managing information from a remote source such as a server for disclosure to an operator of the projector 102. The method 900 may be implemented by using email addresses or website URLs contained within the information-containing device 114 within the lamp 110 to enable the controller 108 of the projector 102 to make contact with information containing websites and/or servers over the network 116. At block 902, the lamp 110 with information-containing device 114 is installed on the projector 102. At block 904, the information-containing device 114 supplies an address which allows communication to be initiated between the projector and a remote site on the Internet. At block 906, information is obtained from a remote site on the internet. At block 908, the information may be disclosed to the operator of the projector. For example, where recall information is available concerning the projector 102, the operator may be informed. Similarly, retail information may be provided to the operator to assist in the purchase of additional lamps or other supplies. And further, update information concerning software and/or firmware updates may be provided to the operator of the projector.

Although the disclosure has been described in language specific to structural features and/or methodological steps, it is to be understood that the appended claims are not limited to the specific features or steps described. Rather, the specific features and steps are exemplary forms of implementing this disclosure. For example, while actions described in blocks of the flow diagrams may be performed in parallel with actions described in other blocks, the actions may occur in an alternate order, or may be distributed in a manner which associates actions with more than one other block. And further, while elements of the methods disclosed are intended to be performed in any desired manner, it is anticipated that computer- or processor-readable instructions, performed by a computer and/or processor, typically located within a projector, reading from a computer- or processor-readable media, such as a ROM, disk or CD ROM, would be preferred.

What is claimed is:

1. A method of operating a projector, comprising:
coupling a lamp containing a memory device onto the projector;
transmitting information contained within the memory device to the projector; and
displaying lamp retail sales information, included within the information, when lamp failure is anticipated to be near.

2. The method of claim 1, wherein anticipating lamp failure comprises:
measuring a time of lamp operation;
adding the measured time to previously measured time;
recording a sum of the measured time and the previously measured time;
estimating life expectancy of the lamp based on the sum; and
providing an operator of the projector with information concerning life expectancy of the lamp when the estimated life expectancy is below a threshold.

3. The method of claim 1, additionally comprising:
obtaining current firmware revision level information from the projector;
comparing the current firmware revision level information to firmware information contained within the memory device; and
where the comparing reveals that a later firmware version is available, providing an operator of the projector with information concerning availability of the later firmware version.

4. The method of claim 1, additionally comprising:
obtaining product ID information from the projector;
comparing the product ID information to a recall list contained within the memory device; and
where a recall is indicated, providing an operator of the projector with information concerning the recall.

5. The method of claim 1, additionally comprising:
locating the lamp, while the lamp is still within packaging, near an install location of the lamp;
establishing contact between a smart card located within the packaging and the projector; and
confirming that the lamp is appropriate for installation within the projector by comparing a model designator of the lamp with a model designator of the projector.

6. The method of claim 1, additionally comprising:
communicating with a remote server at an address contained within the memory device;
obtaining, from the remote server, new information selected from the group comprising: firmware revision level information, product recall information, and lamp retail sales information; and
disclosing the new information to an operator of the projector.

7. A lamp for a projector, comprising:
a memory device;
a communications link allowing transfer of information between the memory device and the projector; and
wherein the memory device is configured, in response to an elapsed time of lamp operation indicating that lamp failure is near, to provide lamp retail information for communication to an operator.

8. The lamp of claim 7, additionally comprising:
current available firmware revision level information, contained within the memory device, for comparison to an existing projector firmware revision level; and
firmware update availability information, contained within the memory device, for providing to an operator of the projector, where a projector firmware update is indicated.

9. The lamp of claim 7, additionally comprising:
current product recall information, contained within the memory device, for comparison to an existing projector model ID.

10. The lamp of claim 7, wherein the memory device additionally comprises a smart card, comprising:
a procedure to respond to the communications link, prior to removal of the lamp from retail packaging, with information for cross-referencing and indicating lamp and projector compatibility.

11. The lamp of claim 7, wherein the memory device additionally comprises:
an address of a remote server, from which may be obtained new information selected from a group comprising: firmware information, product recall information, and lamp retail sales information.

12. A system, comprising:
a lamp containing a memory device;
a communications link for transferring information between the lamp and a projector; and
a procedure for providing information to an operator, wherein the procedure is configured to obtain an address of a remote server from the memory device within the lamp, and wherein the procedure is configured to obtain information from the server selected from a group comprising: firmware information, product recall information, and lamp retail sales information.

13. The system of claim 12, additionally comprising:
a user interface, to provide the information to the operator, wherein the user interface is configured for display on a device selected from a group comprising: a projector screen, a PC or a display carried by the projector.

14. The system of claim 12, additionally comprising a procedure for:
obtaining current firmware revision level information from the projector;
comparing the current firmware revision level information to firmware information contained within the memory device; and
where a later firmware version is available, providing an operator of the projector with information concerning availability of a firmware update for the projector.

15. The system of claim 12, additionally comprising a procedure for:
obtaining product ID information from the projector;
comparing the product ID information to a recall list contained within the memory device; and
where a recall is indicated, providing the operator of the projector with information concerning the recall.

16. The system of claim 12, additionally comprising:
a smart card located within retail packaging of the lamp, wherein the smart card is configured to communicate with the projector and to confirm that the lamp is appropriate for installation within the projector by comparing a model designator of the lamp with a model designator of the projector.

17. The system of claim 12, additionally comprising a procedure for:

measuring cumulative hours of lamp operation; and displaying retail information when the cumulative hours of lamp operation are within a threshold value of expected lamp life.

18. A system, comprising:
a projector having a consumable component;
a memory device, contained within the consumable component;
an application having access to the memory device; and
a user interface, updated by the application, configured to display information from the memory device within the consumable component.

19. The system of claim 18, wherein the application is configured to compare lamp use information with lamp life information and a threshold value and to display retail purchase information to an operator when the lamp use information is within the threshold value of the lamp life information, wherein the retail purchase information is obtained from the memory device.

20. The system of claim 18, wherein the application obtains additional information over a network using a network address obtained from the memory device.

21. The system of claim 18, wherein the application is configured to compare available firmware revision information obtained from the memory device with firmware revision information from the projector.

22. The system of claim 18, wherein the memory device is configured to include projector recall information, and wherein the user interface is configured to display the projector recall information when the projector has been recalled by a vendor.

23. A system, comprising:
means for containing information within a lamp, wherein the lamp is configured for operation within a projector;
means for communicating the information between the lamp and the projector, both prior to installation of the lamp and after installation of the lamp;
means for using the information in the course of lamp installation and projector operation.

24. The system of claim 23, wherein the means for using the information comprises:
means for checking projector model type and lamp model type, prior to lamp installation;
means for confirming compatibility between the projector model type and the lamp model type;
means for alerting an operator where an incompatibility exists.

25. The system of claim 23, wherein the means for using the information comprises:
means for measuring time of lamp operation;
means for estimating life expectancy of the lamp using the measured time; and
means for providing an operator of the projector with information concerning the estimated life expectancy of the lamp when estimated life expectancy is below a threshold.

26. The system of claim 23, wherein the means for using the information comprises:
means for obtaining current firmware revision level information from the projector;
means for comparing the current firmware revision level information to firmware information contained within the means for containing information; and
means for providing an operator of the projector with information concerning availability of a firmware update for the projector, where the means for comparing indicates that a later firmware version is available.

27. The system of claim 23, wherein the means for using the information comprises:
means for obtaining product ID information from the projector;
means for comparing the product ID information to a recall list contained within the means for containing information; and
means for providing an operator of the projector with information concerning a recall, where the recall is indicated by the means for comparing.

28. The system of claim 23, wherein the means for using the information comprises:
means for sending a message to an address contained within the means for containing information;
means for obtaining, from a server at the address contained within the means for containing information, new information selected from the group comprising: firmware revision level information, product recall information and lamp retail sales information; and
means for disclosing the new information to an operator of the projector.

29. A lamp for a projector, comprising:
means for containing information within the lamp;
means for communicating information between the means for containing information and the projector;
means for obtaining product ID information from the projector;
means for comparing the product ID information to a recall list contained within the means for containing information; and
means for providing an operator of the projector with information concerning the recall, where a recall is indicated by the means for comparing.

30. The lamp of claim 29, additionally comprising:
means for obtaining a current firmware revision level information from the projector;
means for comparing the current firmware revision level information to firmware information contained within the means for containing information; and
means for providing the operator of the projector with information concerning availability of a firmware update for the projector, where a later firmware version is available.

31. The lamp of claim 29, additionally comprising:
means for tracking elapsed time of lamp operation; and
means for communicating lamp retail information to the operator when the elapsed time of lamp operation exceeds a threshold indicating likelihood of lamp failure, as established by data within the means for containing information within the lamp.

32. The lamp of claim 29, additionally comprising:
means for confirming that the lamp is appropriate for installation within the projector by using the means for communicating, prior to removal of the lamp from retail packaging, and by comparing a model designator of the lamp with a model designator of the projector.

33. The lamp of claim 29, wherein the memory device additionally comprises:
means for sending a message to an address contained within the means for containing information;
means for obtaining, from a server at the address contained within the means for containing information, new information selected from the group comprising: firmware revision level information, product recall information and lamp retail sales information; and
means for disclosing the new information to the operator of the projector.

34. A processor-readable medium comprising processor-executable instructions for:
- establishing communication between a projector and a memory device on a lamp;
- obtaining current firmware revision level information from the projector;
- comparing the current firmware revision level information to firmware availability information contained within the memory device; and
- where a later firmware version is available, providing an operator of the projector with information concerning availability of a firmware update for the projector.

35. The processor-readable medium of claim 34, comprising further instructions for:
- measuring a time of lamp operation;
- estimating remaining life of the lamp based on the measured time; and
- providing an operator of the projector with information on the estimated remaining life of the lamp when the estimated remaining life of the lamp is below a threshold.

36. The processor-readable medium of claim 34, comprising further instructions for:
- displaying lamp retail sales information, included within the information, when lamp failure is near in time.

37. The processor-readable medium of claim 34, comprising further instructions for:
- obtaining product ID information from the projector;
- comparing the product ID information to a recall list contained within the memory device; and
- where a recall is indicated by the comparing, providing an operator of the projector with information concerning the recall.

38. The processor-readable medium of claim 34, comprising further instructions for:
- detecting the lamp, while the lamp is still within packaging, near an install location of the lamp;
- establishing communication between a smart card located within the packaging and the projector; and
- determining if the lamp is appropriate for installation within the projector by comparing a model designator of the lamp with a model designator of the projector.

39. The processor-readable medium of claim 34, comprising further instructions for:
- sending a message to an address contained within the memory device;
- obtaining, from a server at the address, new information selected from the group comprising: firmware revision level information, product recall information and lamp retail sales information; and
- disclosing the new information to an operator of the projector.

40. A processor-readable medium comprising processor-executable instructions for:
- establishing communications between a memory device within a lamp and a projector;
- retrieving information contained within the memory device; and
- providing an operator of the projector with information from the memory device.

41. A processor-readable medium as recited in claim 40, comprising further instructions for:
- checking projector model type and lamp model type prior to removal of the lamp from retail packaging;
- confirming compatibility between the projector model type and the lamp model type; and
- alerting an operator where an incompatibility exists.

42. A processor-readable medium as recited in claim 40, comprising further instructions for:
- obtaining current firmware revision level information from the projector;
- comparing the current firmware revision level information to firmware information contained within the memory device; and
- where a later firmware version is available, providing an operator of the projector with information concerning availability of a firmware update for the projector.

43. A processor-readable medium as recited in claim 40, comprising further instructions for:
- obtaining product ID information from the projector;
- comparing the product ID information to a recall list contained within the memory device; and
- where a recall is indicated, providing an operator of the projector with information concerning the recall.

44. A processor-readable medium as recited in claim 40, comprising further instructions for:
- sending a message to an address contained within the memory device;
- obtaining, from a server at the address contained within the memory device, new information selected from the group comprising: firmware revision level information, product recall information and lamp retail sales information; and
- disclosing the new information to an operator of the projector.

* * * * *